United States Patent [19]

Sielaff

[11] Patent Number: 4,706,573
[45] Date of Patent: Nov. 17, 1987

[54] MODULAR FURNITURE CONSTRUCTION

[76] Inventor: Ulrich Sielaff, 118 Vaughn Ct., Madison, Wis. 53705

[21] Appl. No.: 781,482

[22] Filed: Sep. 30, 1985

[51] Int. Cl.⁴ ............................................. A47B 3/00
[52] U.S. Cl. .............................. 108/111; 312/257 SK; 312/265
[58] Field of Search ............... 108/111, 60, 158, 153, 108/156; 403/291, 55, 41, 102, 408.1, 83, 84; 248/231.1, 316.1; 211/182, 189, 183, 188.2, 165; 312/265, 264, 257 R, 257 SK; 24/128 R, 178

[56] References Cited

U.S. PATENT DOCUMENTS

| | | | |
|---|---|---|---|
| 185,820 | 1/1877 | Colby | 108/111 |
| 730,984 | 6/1903 | Sues | 108/60 |
| 2,440,012 | 4/1948 | Haver | 24/128 R X |
| 2,592,696 | 4/1952 | Hoody | 24/128 R |
| 2,596,374 | 5/1952 | Crapster | 24/128 R |
| 3,223,054 | 12/1965 | Novak | 108/111 |
| 3,632,179 | 1/1972 | Vredevoogd | 312/257 R X |
| 3,722,932 | 3/1973 | Dougall | 403/408.1 X |
| 3,730,601 | 5/1973 | Misenheimer, III | 108/111 X |
| 3,783,801 | 1/1974 | Engman | 108/111 X |
| 3,856,424 | 12/1974 | Beck, Jr. et al. | 403/408.1 X |
| 3,912,410 | 10/1975 | Pofferi | 108/111 X |
| 4,099,472 | 7/1978 | Kellogg | 108/111 X |
| 4,114,553 | 9/1978 | Zidek | 24/128 X |

FOREIGN PATENT DOCUMENTS

| | | | |
|---|---|---|---|
| 959148 | 2/1957 | Fed. Rep. of Germany | 108/111 |
| 566160 | 5/1923 | France | 403/55 |
| 1225815 | 3/1971 | United Kingdom | 24/128 |

Primary Examiner—Peter A. Aschenbrenner
Assistant Examiner—José V. Chen
Attorney, Agent, or Firm—Keith Schoff

[57] ABSTRACT

Decorative and utilitarian modular furniture articles can be arranged into a variety of configurations embodying stacks of shelves from packaged components comprising pre-finished tubing sections with concealed cable or threaded rod fasteners supplied for being inserted into the tube sections to join the components into rigid assembly.

7 Claims, 16 Drawing Figures

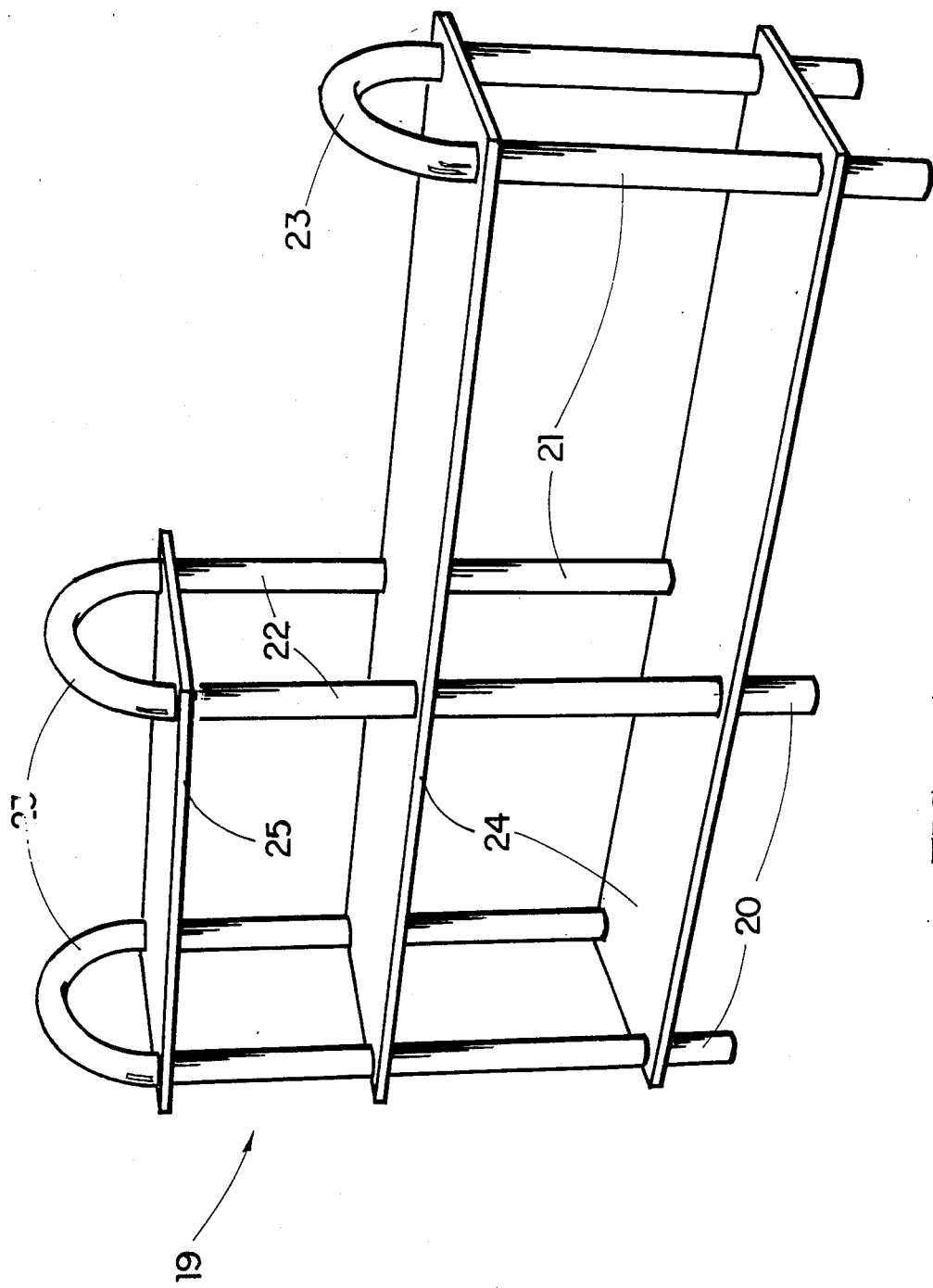

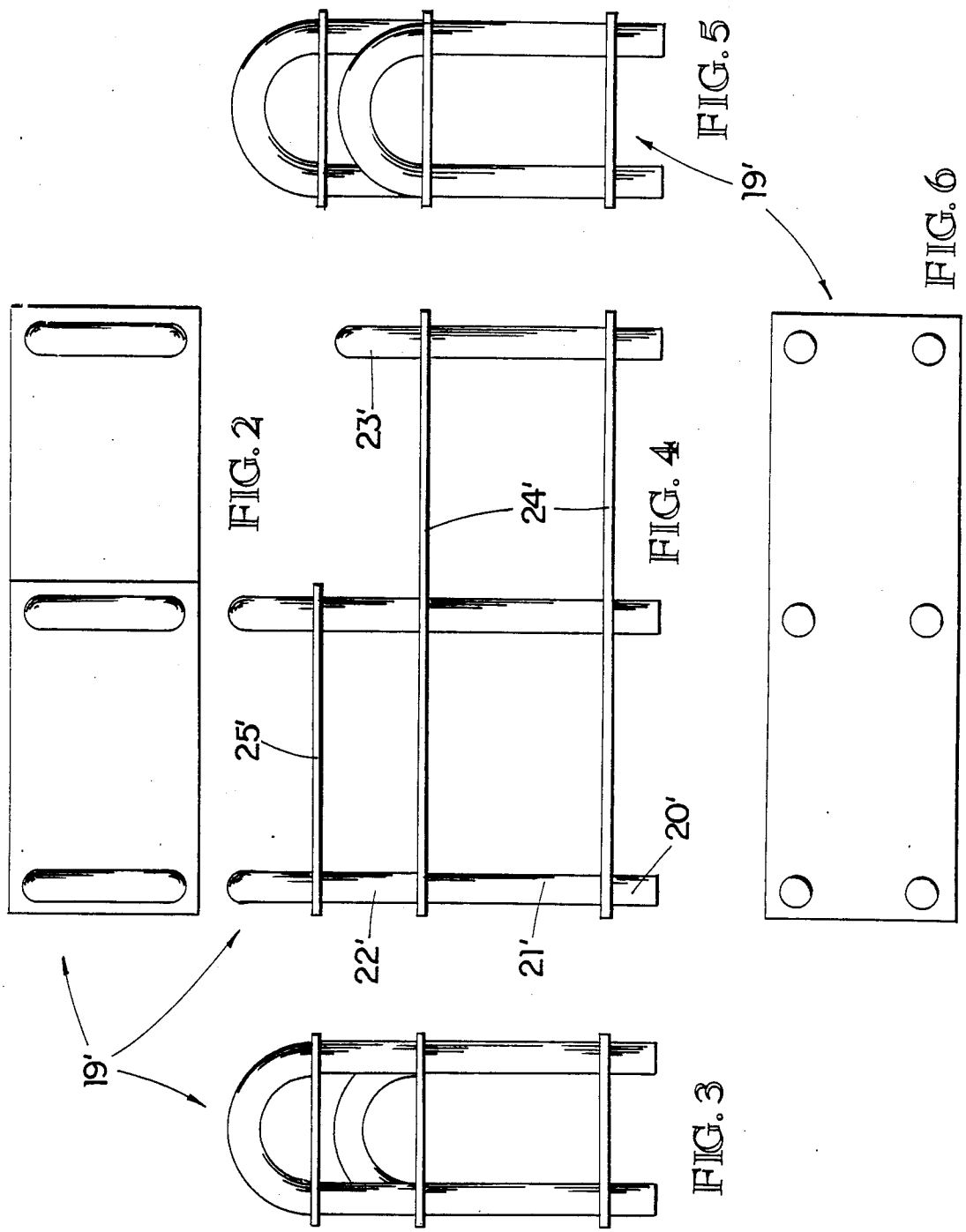

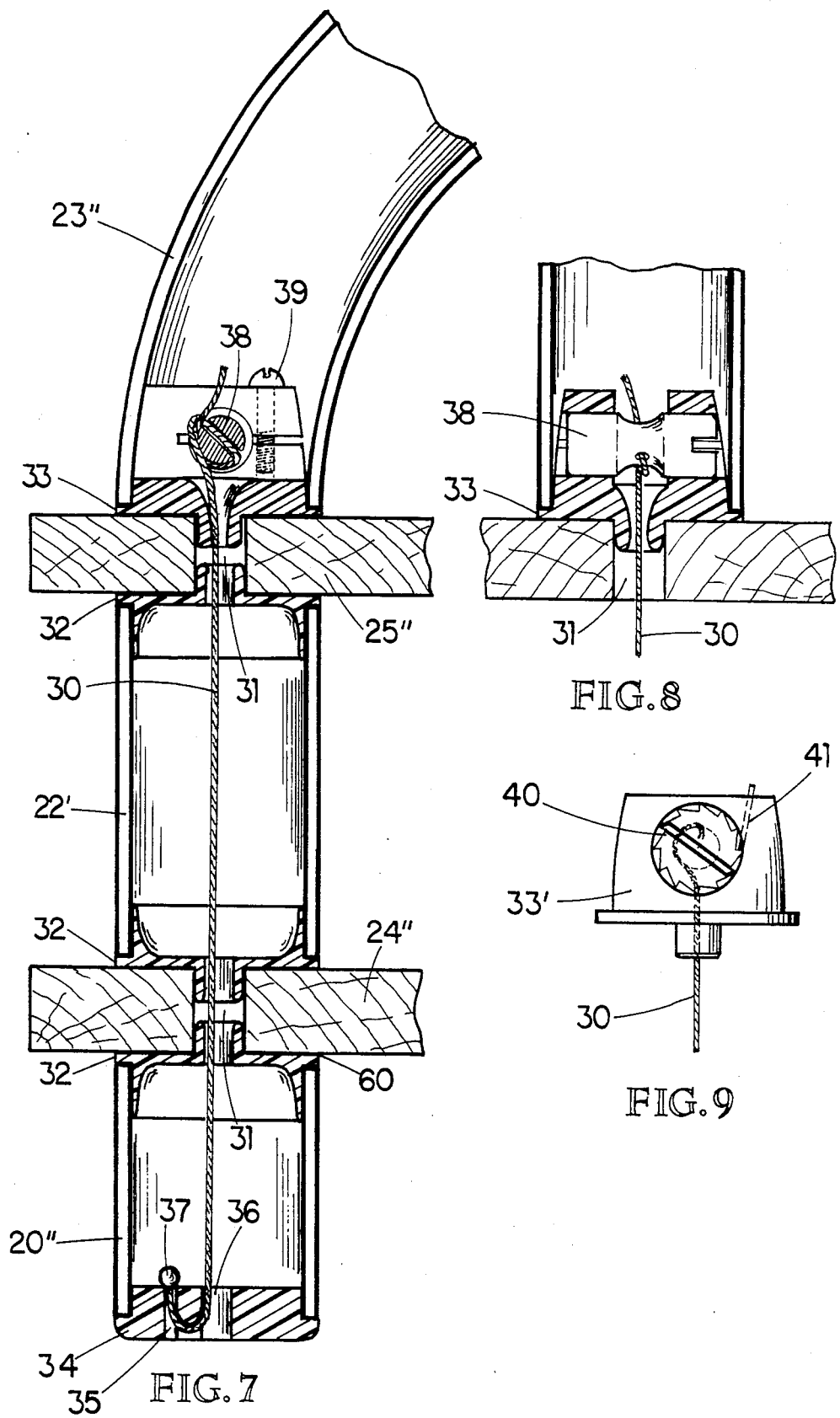

MODULAR FURNITURE CONSTRUCTION

FIELD OF INVENTION

Furniture articles configured with stacked shelves included bookcases, stereo and video electronic component entertainment centers, and computer equipment work stations. In addition, articles for display are placed on stacked corner shelves, wall shelves, and knickknack shelves, and document storage may be made by filing on open shelf stacks.

BACKGROUND OF THE INVENTION

Furniture with open shelves which can be conveniently assembled and disassembled has heretofore utilized tie rods which have been either longitudinally or transversely passed through leg members or shelf separators with the ends secured by use of threaded fasteners. Such fasteners have been applied in manners so as require either long rods or thread spacers as the mechanical means employed for the assembly.

SUMMARY OF THE INVENTION

Elongated, thin shelf separators comprising axially drilled dowels or metal or plastic tubing are provided with prefinished exterior surfaces which are free of irregularity detachable in reflected light which indicates the use of putty filling, welding, riveting or gluing. In end extremity portions of the separators are cavity openings in which anchor means are concealed for receiving tensioning cable or threaded rod which can be tautly drawn either by reel winding or twisting in the case of cable or by rotating thread engaging anchor means in the case of threaded rod. Articles of furniture assembled in such manners of fabrication are sturdy and rigid in construction and exhibit esthetically clean lines with finished surfaces which do not reveal even in reflected light the use or location of fastening means, but which may be readily disassembled or rebuilt into other configurations.

BRIEF DESCRIPTION OF THE DRAWINGS

FIG. 1 is a perspective view of one embodiment of a modular shelf article of this invention;

FIGS. 2, 3. 4. 5, and 6 are, respectively, top. left end, front, right end and bottom views of a variation of the embodiment of the articles of FIG. 1;

FIG. 7 is a cross-sectional end elevation of a portion of an assembled article of this invention showing one fastening embodiment;

FIG. 8 is a cross-sectional front elevation of a portion of the article of FIG. 7;

FIG. 9 is a cross-sectional end elevation of another fastening means of this invention which can be substituted for that shown in FIG. 7 and 8;

DESCRIPTION OF THE INVENTION

Figure 11:
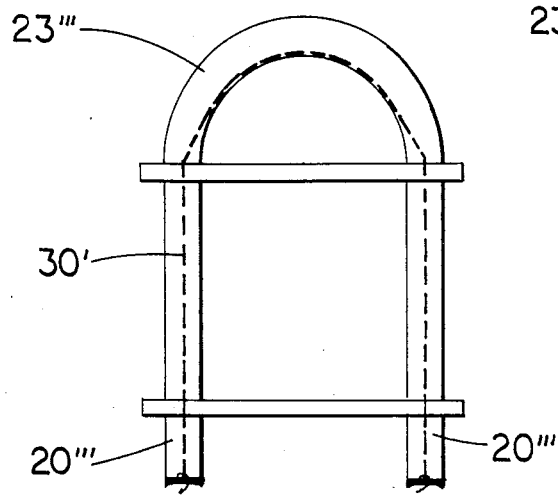
FIG. 11 is an end elevation of an assembled article of this invention utilizing the construction of FIG. 10 with fastening cable shown by hidden line representation.

Referring to FIG. 1, modular free standing furniture piece 19, which may be used as a bookcase or otherwise as desired, comprises shelves 24 and 25 separate by six tubular spacer sections 21 of one length and four sections 22 of shorter length, and are provided with six leg sections 20 of the same material and even shorter length. Three tubular "U" bends 23 fashioned from the same tubular material are disposed above the shelves providing decorative detail to article 19 and in some instances may provide utilitarian handles with which article 19 can be lifted and moved. The several tubular components can be fabricated from the same stock material, preferably which is finished by metal plating, or by being anodized if aluminum, or by painting, or by any other suitable process which provides a uniform and visually attractive finish. In a non-preferred embodiment, wooden components may be used which are axially drilled to provide interior recesses or passages as necessary to accomodate a particular type of concealed fastening means.

Shelves 24 and 25 of article 19 may be made from nominal one by ten inch boards finished in any suitable manner if the article is to be used as a bookcase. Any other suitable material may be used and in any dimension appropriate for the use intended. However, the shelves are drilled with holes of at least one-quarter inch diameter co-axially aligned with complementary holes drilled in other shelves of the furniture piece for enabling fastening means to be disposed to pass through.

In FIG. 2 through 6 article 19' is shown as a variation of article 19 of FIG. 1 in which the proportional length of shelf space 22' with respect to shelf spacers 21' is less than that is the case for spacers 22 and 21 of FIG. 1.

In FIGS. 7 and 8 is shown internal fastening means suitable for use in articles 19 or 19' comprising cable 30 passed through holes 31 in shelves 24", and 25" and also through annular locating pieces 32, 33, and 34. Pieces 32 are configured as a three stepped outer diameter annular nipple for being disposed at the interface between shelving and tubular shelf spacers. A selected piece 32, 33, or 34 is inserted into an end of a tubing section 20", 22", and also into holes 31 in shelves 24", 25" as shown. Complementary annular locating foot 34 is inserted into the bottom of tubular leg 20" with cable 30 being threaded first downward through acentric hole 35 in foot piece 34 and then upward through center hole 36. Enlargement 37 fastened to the end of cable 30 may comprise any suitable bead or the like. Bicycle brake or shifting cable is an ideal material to use because as purchased it is provided with such a bead. As well as metal cable, synthetic resious fiber cable may be used, a particularly suitable material being woven, braided or twisted polyester fiber cord.

Pieces 33 functions both to locate and align tubing sections with a hole in a shelf and as part of a reel assembly in combination with spool 38. Spool 30 is provided with a threading hole for the cable which is disposed transverse to the axis of the spool. One side portion of piece 33 is split to enable the spool to be loosely or securely gripped by piece 33 upon screw 39 being loosened or tightened, spool 38 being rotated by means of a screwdriver to tension cable 30 in requisite manner for rendering the assembly rigid before screw 39 is tightened to maintain tautness in cable 30.

In FIG. 9 is shown an alternative means for gripping spool 38 in lieu of using screw 39, comprising ratchet wheel 40 configured as an end extremity portion of spool 38 and pawl 41 operably disposed in piece 33' for being pivotally manipulatable toward and away from contact with ratchet wheel 40 to prevent or enable the ratchet wheel to rotate in reverse direction, as the case may be.

Figure 10:
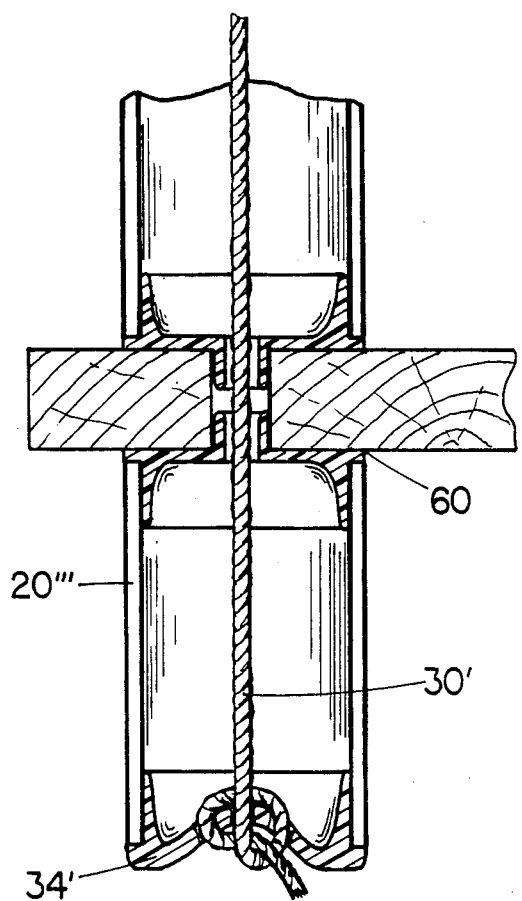
FIG. 10 is a cross-sectional end elevation of a portion of an assembled article of this invention showing another fastening embodiment.

FIG. 10 portrays foot piece 34' as an alternate embodiment for foot piece 34 of FIG. 7 for use when the end of cable 30' is anchored by knotting it. Piece 34' is sized to press tightly into leg sections 20". Piece 34' is configured with an upwardly concave recess in which two acentric holes are disposed in conjunction with a center hole for enabling an end of cable 30' to be threaded first down through the center hole, then up through one of the acentric holes, and then down again through the other of the acentric holes with the bitter end of the cable laced between the bottom surface of foot piece 34' and cable 30' where it underlies the foot piece, the resulting knot so produced being sufficient to hold securely against slipping under tension in cable 30'. Cable 30' is so anchored when assembly is made in the manner shown in FIG. 11 with cable 30' passed through tubular "U" bend 23" so as to extend continuously through a pair of connected tubular shelf separator column assemblies and leg sections. With cable 30' loosely tied in the manner shown in FIG. 10, one or both connected leg sections 20''' are rotated about their axes to twist cable 30' and cause it to shorten in length as a result until the desired tautness for providing desired rigidity of the assembled article is achieved. In this embodiment "U" bends 23''' can be used as handles for lifting the assembled article. Pieces 32 are configured to press tightly into tubular leg sections 20' to provide a bearing surface go upon which the assembly of piece 32 and the tubular leg section can be operably rotated against the shelves, a desirable material for the pieces 32 being high impact polystyrene or other suitable synthetic resin which provides a combination of toughness and lubricity to the article.

Figure 12:
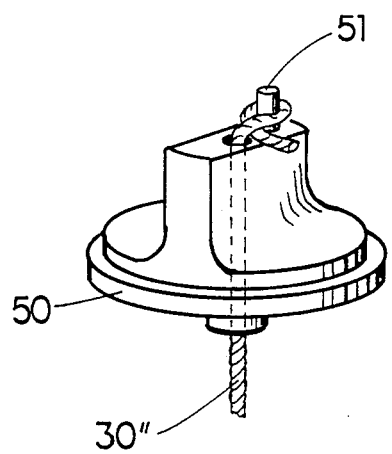
FIG. 12 is a perspective view of another embodiment of an anchor means of this invention with cable attached which can be substituted into the embodiment shown in FIG. 7.

In FIG. 12 anchor piece 50 is shown for use as an alternative to use of piece 33 of FIG. 7. In combination, a center axially vertical hole and acentrically disposed post 51 on the top of piece 50 provide an eye and post arrangement through and around which cable 30''' can be threaded and wrapped with the bitter end of the cable tucked between the lay of cable 30'' and the top of piece 50 to provide an anchoring knot for cable 30''. Anchor piece 50 is rotated to achieve the desired tautness of cable 30".

Figure 13:
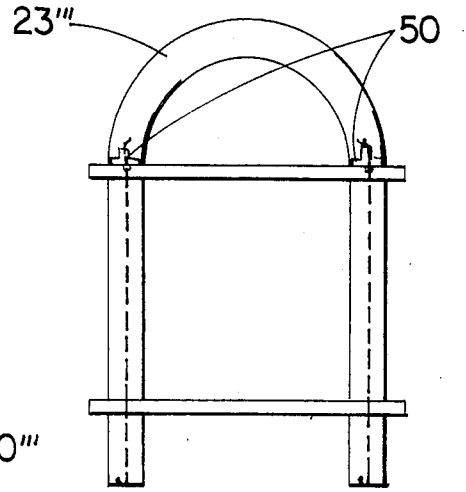
FIG. 13 is an end elevation of an assembled article of this invention utilizing the construction of FIG. 12 with fastening cable shown by hidden line representation.

FIG. 13 illustrates the assembly of the article fastened together by use of elements 50 as shown in FIG. 12. When assembled in this manner, tubing sections 23" are decorative only and are not usable for lifting the assembled article of furniture.

Figure 14:
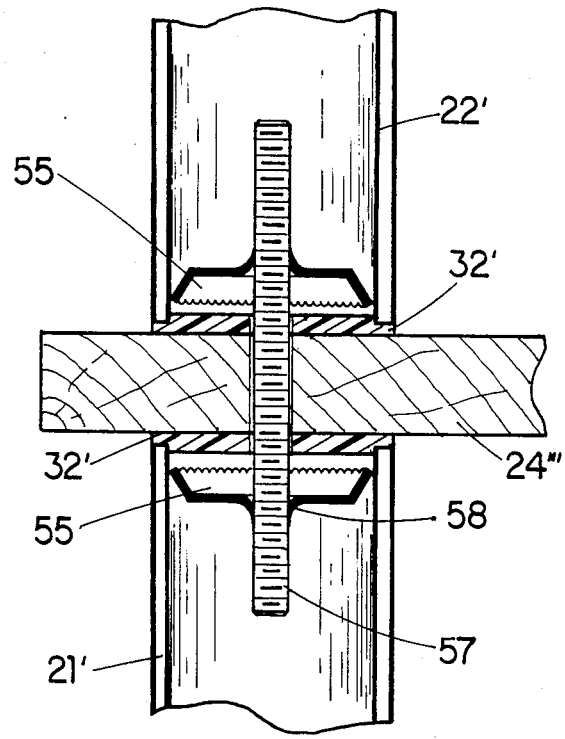
FIG. 14 is a cross-sectional end elevation of a portion of an assembled article of this invention showing yet another fastening embodiment.
Figure 15:
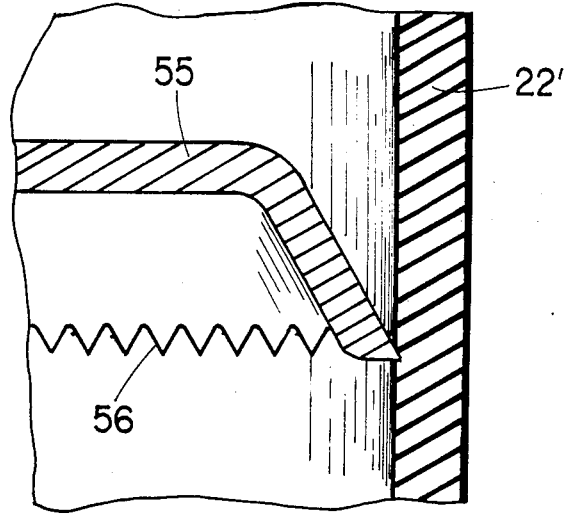
FIG. 15 is an enlarged detail view of a portion of the fastening embodiment of FIG. 14.

As an alternative to cable used as a component of fastening means described hereinabove, FIG. 14 and 15 show use of threaded rods secured in anchor members 55. Members 55 are configured as shallowly dished discs with teeth or serrations 56 disposed around the outer periphery and threaded opening 58 in the center. They are press fitted into the ends of tubular sections in a manner which causes teeth 56 to bite into the inner surface of the tubular wall of the shelf separator sections when attempt is made to withdraw them such as by tensioning threaded rod 57. Thus, resilient metal, preferably hardened steel, is used for constructing members 55 with the threads being either machined or pressed into the center opening, or in the case of small size components members 55 can be constructed in the manner employed for making sheet metal speed nuts. Stepped diameter washers 32' are shown for providing a bearing surface between shelf 24''' and the ends of tubular sections 21' and 22', however, such means are not necessary to functional operability of the fasteners.

Figure 16:
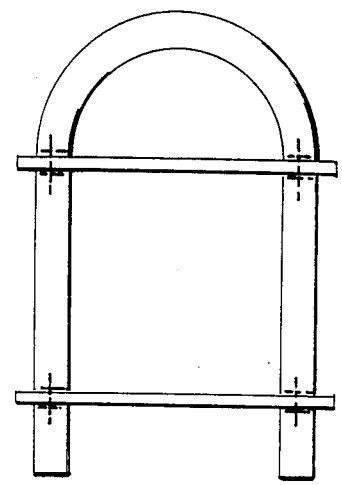
FIG. 16 is an end elevation of an assembled article of this invention utilizing the construction of FIG. 15 with fasteners shown by hidden line representation.

In all of the modes of assembly shown, the outer wall surface of the tubular sections are free of irregularities or distortions which reveal the presence of fastening means disposed within them whereas expedients such as welding or riveting will show as detectable distortion in the uniformity of the surface of the outside of a tubular section. In all modes of assembly described, disassembly is accomplished in reverse order of that used for making the assembly. Square section tubing or other polygonal or conic section configuration may be used for the leg and shelf spacer sections in this invention with appropriate complementary configuration being provided for anchor plates, bearing surface parts and decorative bends used in conjunction with such sections. In the embodiment of invention shown in FIG. 14-16, shelf separating sections need only have end-open recessed cavities sufficiently deep to operably receive the fastening hardware and need not necessarily extend through the length of the sections.

I claim:
1. Modular shelf connector means comprising
   (a) at least one elongated shelf spacing member configured with an opening extending substantially axially therethrough,
   (b) an elongated multi-stranded cable tension member disposed through said spacing member within said opening,
   (c) anchor means fixedly connected to said cable tension member coaxially rotatively biasable together therewith to twist multiple strands of said cable tension member,
   said connector means utilized by said spacing member being disposed substantially perpendicularly extending between facing surfaces of shelving to be connected in a stack, and aligned with holes through such shelving with said anchor means disposed outboard of said shelving substantially axially aligned with said spacing member and with said cable tension member disposed through said spacing member and shelving and connected to said anchor means wherein said anchor means is rotated coaxially with said tension member to draw said tension member taut and secure said spacing member and shelf into tightly abutting contact.

2. The connector means of claim 1 wherein said spacing member comprises tubing.

3. The connector means of claim 1 comprising in addition one said spacing member disposed outboard of shelving between said anchor means and shelving, and wherein said anchor means comprises a stepped diameter plug disposed in an end of said one spacing member and bearing on the end of said one said spacing member.

4. The connector means of claim 3 wherein said anchor means comprises plug means received in said spacing member and configured with a center hole and at least one acentrically disposed means through and about which cable can be threaded and wrapped.

5. The connector means of claim 1 wherein said elongated spacing member is curvilinearly configured through a substantially 180 degree bend and having an end abutting against an outboard face of an outboard shelf and with said tension member disposed therethrough.

6. The process of constructing a strong, rigidly connected free standing article of furniture which embodies at least one horizontal shelf wherein said shelf is provided with a plurality of openings extending between horizontal faces thereof, and wherein a plurality of annular spacing means are disposed in end-abutting relationship with a horizontal face of said shelf and aligned with said openings, and wherein multi-stranded cord tension members are threaded through each of said spacing means and said openings disposed in association, comprising the steps of
 (a) providing in each said shelf openings of sufficient diameter to enable a tension member to be threaded therethrough,
 (b) providing a plurality of annular spacing means aligned with openings provided in said shelf,
 (c) providing a multi-stranded cord tension member in threaded disposition through each of associated openings and spacing means disposed in continuous alignment,
 (d) providing a plurality of anchor means and securing one said anchor means to each terminal portion of said cord tension member,
 (d) operably rotating said anchor means secured to at least one terminal portion of each said cord tension member about the axis of said tension member to shorten the length of said tension member to draw said shelf and said anchor and said spacing means into firm abutting contact thereby rendering the assembly rigid.

7. The process of claim 6 wherein said anchor means is disposed abutting an end of said spacer means.

* * * * *